United States Patent
Stats

(10) Patent No.: US 6,588,198 B2
(45) Date of Patent: Jul. 8, 2003

(54) HIGH PRESSURE BYPASS SLIDING SETPOINT FOR STEAM-COOLED ADVANCED MACHINE

(75) Inventor: David Andrew Stats, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/284,345

(22) Filed: Oct. 31, 2002

(65) Prior Publication Data

US 2003/0061798 A1 Apr. 3, 2003

Related U.S. Application Data

(62) Division of application No. 09/812,574, filed on Mar. 21, 2001, now Pat. No. 6,502,401.

(51) Int. Cl.[7] .................................................. F02C 6/18
(52) U.S. Cl. .................................................. 60/39.182
(58) Field of Search ........................... 60/39.182, 39.53, 60/806, 39.3

(56) References Cited

U.S. PATENT DOCUMENTS

| | | |
|---|---|---|
| 4,976,100 A | 12/1990 | Lee |
| 5,386,685 A | 2/1995 | Frutschi |
| 5,577,377 A | 11/1996 | Tomlinson |

Primary Examiner—Louis J. Casaregola
(74) Attorney, Agent, or Firm—Banner & Witcoff, Ltd.

(57) ABSTRACT

A system and method for controlling flow of cooling steam in an advanced machine is provided. The advanced machine includes a gas turbine, which is connected to a heat recovery steam generator (HRSG) via HP and/or IP valves. The HRSG provides cooling steam to cool the gas turbine using a high pressure drum. The pressure of the high pressure drum is measured during start-up of the advanced machine. A pressure setpoint associated with providing cooling steam via valves is set equal to the lowest measured pressure of the high pressure drum that is greater than a floor pressure setpoint for the gas turbine. Therefore, when the high pressure drum is pressurized above the floor pressure setpoint during start-up, the pressure in the HP drum is maintained.

6 Claims, 2 Drawing Sheets

HIGH PRESSURE BYPASS SLIDING SETPOINT FOR STEAM-COOLED ADVANCED MACHINE

CROSS REFERENCE TO RELATED APPLICATIONS

This application is a divisional of U.S. application Ser. No. 09/812,574, filed Mar. 21, 2001 (U.S. Pat. No. 6,502,401), the entire contents of which are incorporated herein by reference.

BACKGROUND OF THE INVENTION

The present invention is generally related to controlling drum pressure in a Heat Recovery Steam Generator (HRSG) that is contained in a steam cooled advanced machine gas turbine and it's associated steam turbine for power generation.

In the 9H or 7H advanced machine gas turbines manufactured by General Electric, mainly steam cooling instead of air-cooling are utilized. During start-up, a sufficient flow of steam through high pressure (HP) and intermediate pressure (IP) bypass valves must be established as a permissive or threshold to cool the gas turbine before the gas turbine can be loaded beyond a minimum load. This minimum load is referred to as spinning reserve. Prior to and during spinning reserve, the gas turbine is air-cooled and must then be steam-cooled to be loaded above the spinning reserve.

In most applications, the HRSG includes three pressures of steam generation and hence three separate steam drums, high pressure steam (HP), intermediate pressure steam (IP) and low pressure steam (LP). The permissive of steam flow is established through HP and/or IP bypass valves, before the gas turbine can be steam-cooled. In order to establish the permissive of steam flow, drum pressure for the HP drum in the gas turbine must be greater than a predetermined level (i.e., a floor pressure setpoint (e.g., 720 psi)). Thus, when the bypass valves are open, HP drum pressure is maintained at the floor pressure setpoint. Floor pressure is the minimum pressure at which steam may be admitted to the steam turbine.

During a cold start-up in which the advanced machine has been off for a significant time period, HP drum pressure is low due to the HRSG connected to the gas turbine being cold and the HP drum pressure being below the floor pressure setpoint. For example, during start-up of the advanced machine, the HRSG is purged by air flowing from the unfired gas turbine through the HRSG. The gas turbine is then fired (after the HRSG purge) and loaded to spinning reserve, which allows the HP drum pressure to increase due to heated flue gas entering HRSG. Eventually, the HP drum pressure is greater than the floor pressure setpoint, and the HP bypass valves open to maintain floor pressure until the gas turbine is being steam cooled and the bypass valves close.

When the HP drum pressure is greater than the floor pressure setpoint during start-up (e.g., during start-up after a recent shutdown), the bypass valves open until floor pressure is reached and then close to maintain pressure, for example, when the gas turbine is unfired or recently fired. Therefore, energy contained in the HP drum as steam pressure is lost as steam flows through the bypass valves, prior to the gas turbine reaching spinning reserve. Accordingly, HP drum pressure must then be re-established for providing steam after spinning reserve. Therefore, time and fuel are lost as sufficient heat in the HRSG is generated and pressure in the HP drum is increased to allow the gas turbine to be loaded beyond the spinning reserve.

Consequently, a need exists for providing a technique that prevents depressurization of a HP drum in the HRSG when HP drum pressure is above a floor pressure setpoint during start-up of the advanced machine.

SUMMARY OF THE INVENTION

A bypass valve pressure setpoint, hereinafter referred to as pressure setpoint, is set when an HP drum in a gas turbine is at its lowest energy level (i.e., lowest drum pressure) and still above a floor pressure setpoint. During this scenario, the HP drum pressure decays during an initial HRSG purge and increases after the gas turbine is fired. The HP drum pressure is measured and the pressure setpoint is set equal to the lowest HP drum pressure above the floor pressure setpoint. Therefore, the set pressure setpoint is greater than the floor pressure setpoint, thereby maintaining the energy contained in the HP drum. Furthermore, significant time can be saved, because HP drum pressure does not have to be re-established.

Other features and advantages of the present invention will become apparent with reference to the following detailed description and figures.

DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
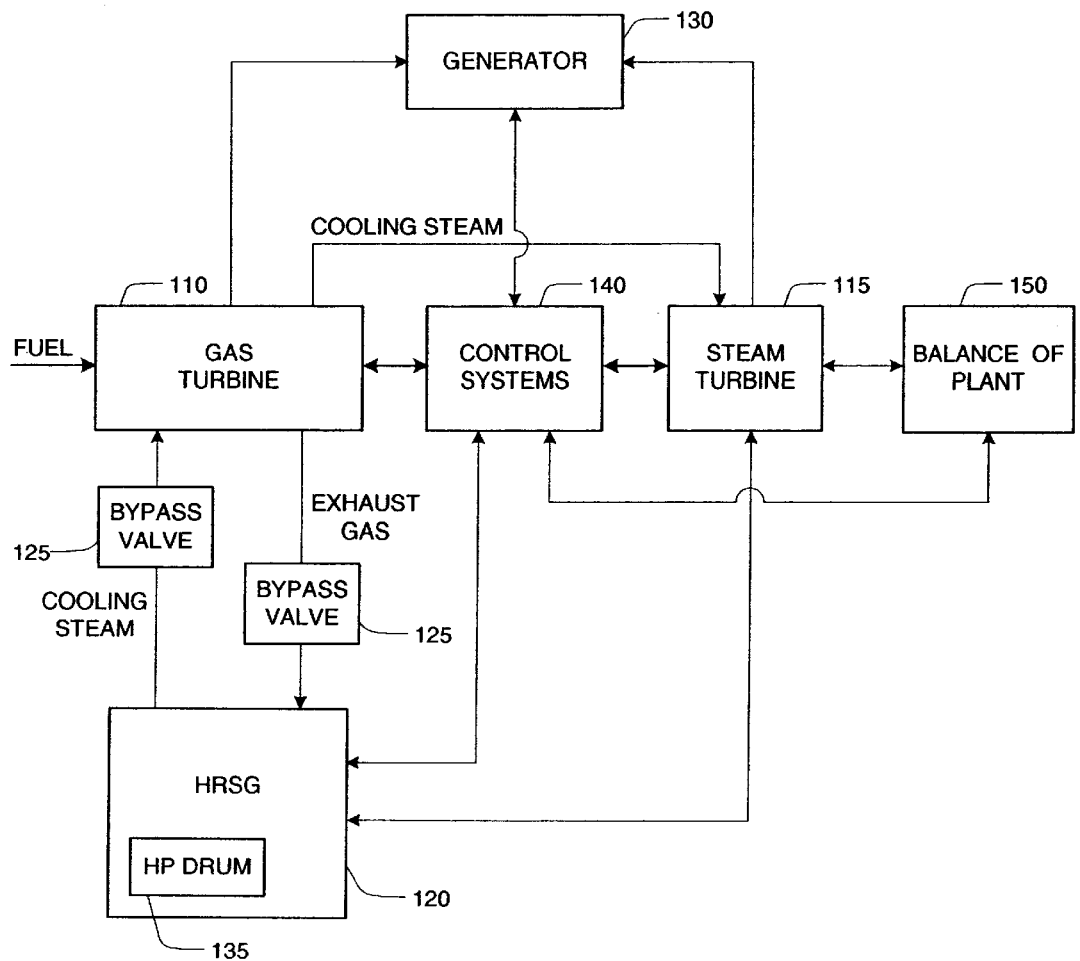
FIG. 1 illustrates an illustrative system employing the principles of the present invention.

FIG. 1 illustrates an exemplary embodiment of a power system including an advanced machine employing the principles of the present invention. An advanced machine including a gas turbine 110, which is connected to HRSG 120, generates shaft power for generator 130 includes gas turbine 110. The advanced machine is not limited to a gas turbine. One of ordinary skill in the art would readily recognize that an advanced machine might include multiple gas generators, HRSG's, steam turbines and the like depending on the supported load.

HRSG 120 generates steam, some of which is used to cool gas turbine 110, and is coupled to gas turbine 110 via HP and/or IP bypass valves 125. The majority of the steam generated by the HRSG 120 plus the gas turbine cooling steam flows to a steam turbine 115 for power generation. Also, HRSG 120 includes high pressure (HP) drum 135 to establish the water level for an evaporator therein and to maintain pressure. The evaporator is a heat exchange surface that generates steam. Although only an HP drum 135 is shown as part of the HRSG 120 depicted in FIG. 1, it is not so limited. It should be understood that the HRSG 120 could include three pressures of steam generation and hence three separate steam drums, High Pressure Steam (HP), Intermediate Pressure Steam (IP), and Low Pressure Steam (LP). Also, the steam turbine 115 receives boiler feed water and can emit exhaust steam to the balance of the plant 150 of the power system, and can provide shaft power to the generator 130.

During start-up, gas turbine 110 begins a start-up procedure, which includes purging of HRSG 120 with fresh air moved by a compressor of gas turbine 110 and then firing and loading of gas turbine 110 to generate power.

During the start-up procedure in a hot restart for gas turbine 110 in the advanced machine, HRSG 120 is purged by air flowing from unfired gas turbine 110 to HRSG 120 as exhaust gas via bypass valves 125. The airflow cools steam generation and heating surfaces of HRSG 120 and lowers the pressure of HP drum 135. A hot restart corresponds to a start-up scenario in which the pressure of HP drum 135 is above the floor pressure setpoint. Typically, in a hot restart, the drum pressure was recently (e.g., the advanced machine was turned off in the last several minutes) at a high operating pressure and bypass valves 125 were closed to maintain that pressure. Fresh air from the unfired gas turbine 110 cools the HRSG 120 and evaporator water causing the pressure and the water temperature to decline. Then gas turbine 110 is fired and begins to load to a spinning reserve, and the pressure of HP drum 135 increases. At some point after the gas turbine 110 is fired, HP and/or IP bypass valves 125 open when the pressure of HP drum 135 is greater than a pressure setpoint. The pressure setpoint becomes the point at which the HP drum 135 reaches its lowest pressure during a hot restart or similar start where the drum pressure is above the preset floor pressure; otherwise, the floor pressure setpoint is used.

The pressure setpoint is a pressure value for the HP drum 135. The pressure value is based on a pressure of HP drum 135, measured during start-up, and a predetermined floor pressure setpoint for gas turbine 110. The floor pressure setpoint is a threshold that is usually determined by a manufacturer of the steam turbine 115. The steam turbine 115 accepts the steam generated in HRSG 120 and also all the cooling steam from gas turbine 110. The steam is used to generate power in the steam turbine 115. This method of setting the HP drum pressure is advantageous since the pressure being maintained allows the HP bypass valve 125 to open sooner than if, for example, the floor pressure was the setpoint, and therefore establishes steam flow. The method for setting the floor pressure setpoint is described in detail below.

Figure 2:
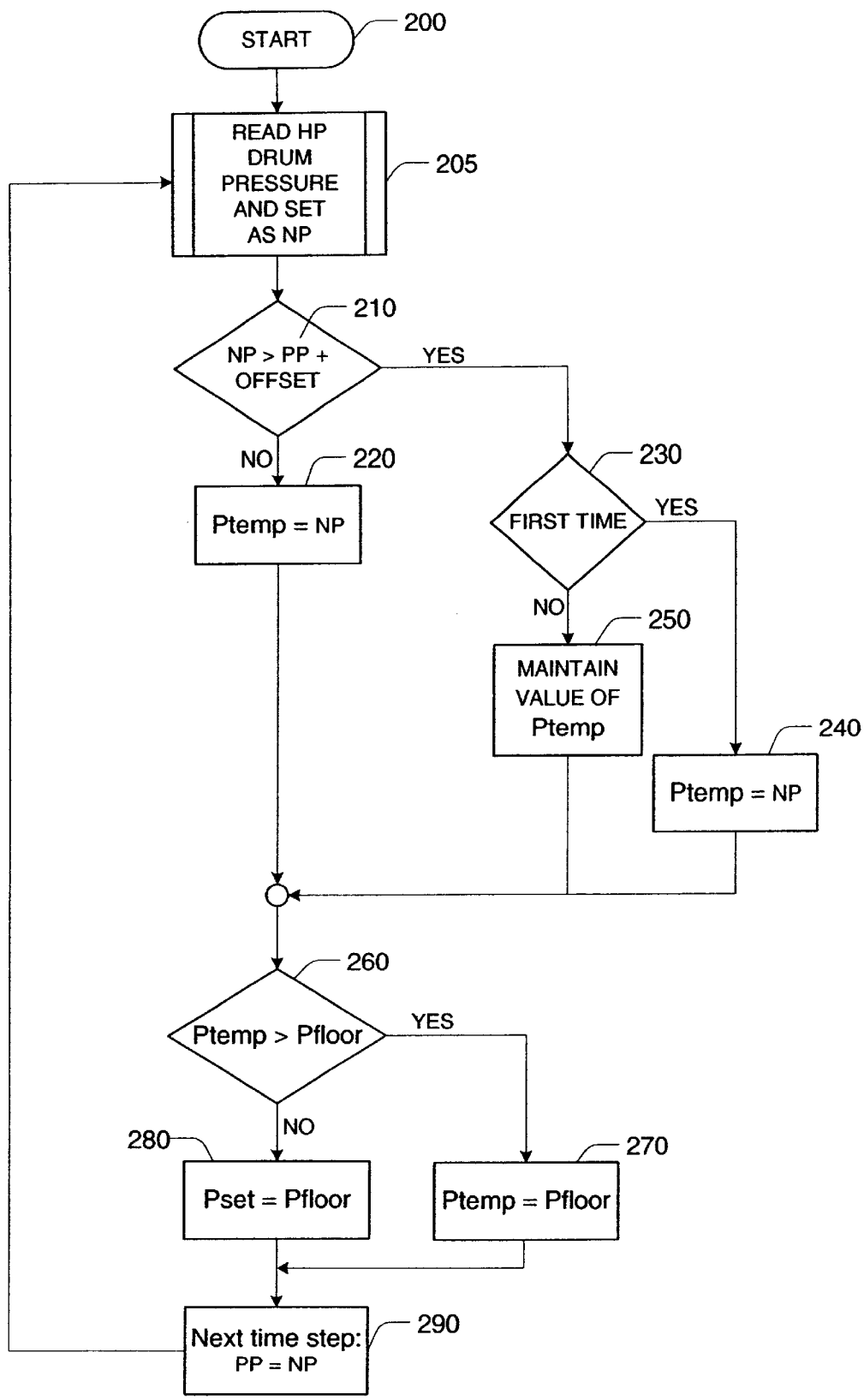
FIG. 2 illustrates a flow diagram of a method according to an illustrative embodiment of the present invention.

The steps illustrated in FIG. 2 may be incorporated in software (e.g., firmware) running on processor-based control system 140 that is connected to and controls gas turbine 110, steam turbine 115, HRSG 120, and the balance of the plant 150. For example, control system 140 can include software for receiving measurements of HP drum pressure, setting the pressure setpoint and controlling HP and/or IP bypass valves 125, according to the method described below and shown in FIG. 2. Instituting software for controlling power generation systems is well known in the art, and one of ordinary skill in the art could readily program the steps illustrated in FIG. 2 using known programming languages and techniques.

FIG. 2 illustrates a flow diagram of a method for setting a pressure in HP drum 135 in HRSG 120 according to a preferred embodiment of the present invention. The method illustrated in FIG. 2 is described in conjunction with an advanced machine having a gas turbine 110 shown in FIG. 1, for illustrative purposes. It should be understood that the method shown in FIG. 2 is applicable to the operation of many types of combined cycle units such as the H System™ (e.g., the 7H or 9H advanced machine gas turbine) manufactured by General Electric.

In step 200, the gas turbine 110 of the advanced machine begins a start-up procedure. Next, in step 205, the pressure of HP drum 135 is measured and a new pressure value (NP) is read continuously, on the order of once every ⅛ of a second. The time period between successive pressure measurements of HP drum 135 is readily determined by one of ordinary skill in the art and may vary depending on the type of gas turbine and load. A conventional device for measuring pressure can be used for measuring the pressure of HP drum 135 in HRSG 120. Conventional HRSG's include systems for automatically monitoring HP drum pressure.

After a new pressure value (NP) has been measured and read, in step 210, it is compared with the sum of the last pressure value (PP) measured during the preceding time period and an offset (e.g. 10 psi). If the new pressure value (NP) is greater than the preceding pressure value (PP) plus the offset, then it is determined whether this is the first instance in which this condition has occurred (i.e., NP>PP+offset) in step 230. If this is the first instance, then the new pressure value (NP) becomes the temporary pressure setpoint (Ptemp) in step 240. If this is not the first instance that the new pressure value (NP) is greater than the preceding pressure value (PP) plus an offset, then the temporary pressure setpoint (Ptemp) is maintained in step 250. Once gas turbine 110 is loaded sufficiently and continues to increase its operating speed, the temporary pressure setpoint does not change since the drum pressure continues to rise and the temporary pressure setpoint (Ptemp) remains locked in step 250. As long as the previous pressure (PP) remains lower than the new pressure (NP), the pressure setpoint will remain locked.

Otherwise, if, in step 210, the preceding pressure value (PP) plus the offset is greater than or equal to the new pressure value (NP), the temporary pressure setpoint (Ptemp) becomes the new pressure value (NP) in step 220. When the previous pressure (PP) becomes the temporary pressure setpoint (Ptemp) in step 240, or is maintained in step 250 or the previous pressure (PP) becomes the temporary pressure setpoint (Ptemp) in step 220, the temporary pressure setpoint (Ptemp) is compared with the floor pressure setpoint (Pfloor) in step 260. The floor pressure setpoint can vary and may be on the order of 720 psi. If the temporary pressure setpoint (Ptemp) is greater than the floor pressure (Pfloor), then the pressure setpoint (Pset) becomes the temporary pressure setpoint (Ptemp) in step 270. Otherwise, the floor pressure setpoint (Pfloor) is set as the pressure setpoint (Pset) in step 280. In the next time step, the previous pressure (PP) is set as the new pressure (NP) in step 290 and control of the process then returns to step 205 to repeat the process for the next time period. In the next time period, another new pressure value (NP) is measured and the process is repeated.

Using the method shown in FIG. 2, the pressure setpoint is set so HP drum 135 is not de-pressurized when the pressure of HP drum 135 is greater than the floor pressure setpoint during the start-up procedure of advanced machine including the gas turbine 110. Therefore, the energy in HP drum 135 is conserved during the start-up procedure of the advanced machine including gas turbine 110, and time and energy is not wasted to rebuild pressure in HP drum 135 after HP drum 135 has been de-pressurized.

What have been described are the preferred embodiments of the present invention. It will be apparent, however, to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A system for generating power comprising:

a gas turbine;

a steam generator including a drum providing steam to said gas turbine; turbine and at least one valve controlling a flow of steam from said steam generator to said gas turbine; and a control system configured to determine a pressure setpoint and a pressure of said drum cause, said at least one valve to provide steam to said gas turbine when the pressure of said drum is greater than the pressure setpoint.

2. The system of claim 1, wherein said control system is configured to 1) measure the pressure of said drum during start-up of said system and 2) set the pressure setpoint based on the measured drum pressure.

3. The system of claim 2, wherein when a temporary pressure based on the measured drum pressure is greater than a floor pressure setpoint, said control system setting the pressure setpoint equal to the temporary pressure.

4. The system of claim 2, wherein when a temporary pressure based on the measured drum pressure is greater than a floor pressure setpoint, said control system measuring the pressure of said drum continuously until one of 1) said gas turbine is fired or 2) any one of the temporary pressures based on the measured drum pressures is less than the floor pressure setpoint.

5. The system of claim 4, wherein when any one of the temporary pressures is not greater than the floor pressure setpoint, said control system setting the pressure setpoint equal to the floor pressure setpoint.

6. The system of claim 1, wherein said at least one valve includes at least one of a high pressure valve and an intermediate pressure valve.

* * * * *

UNITED STATES PATENT AND TRADEMARK OFFICE
CERTIFICATE OF CORRECTION

PATENT NO. : 6,588,198 B1  
DATED : July 8, 2003  
INVENTOR(S) : David Andrew Stats Page 1 of 1

It is certified that error appears in the above-identified patent and that said Letters Patent is hereby corrected as shown below:

Column 5,  
Line 2, "turbine and" has been removed;  
Line 6, -- and to -- has been added before "cause,"

Signed and Sealed this

Fourth Day of November, 2003

JAMES E. ROGAN  
*Director of the United States Patent and Trademark Office*